Nov. 10, 1931.   L. R. NELSON   1,831,540
LAWN SPRINKLER
Filed March 20, 1930
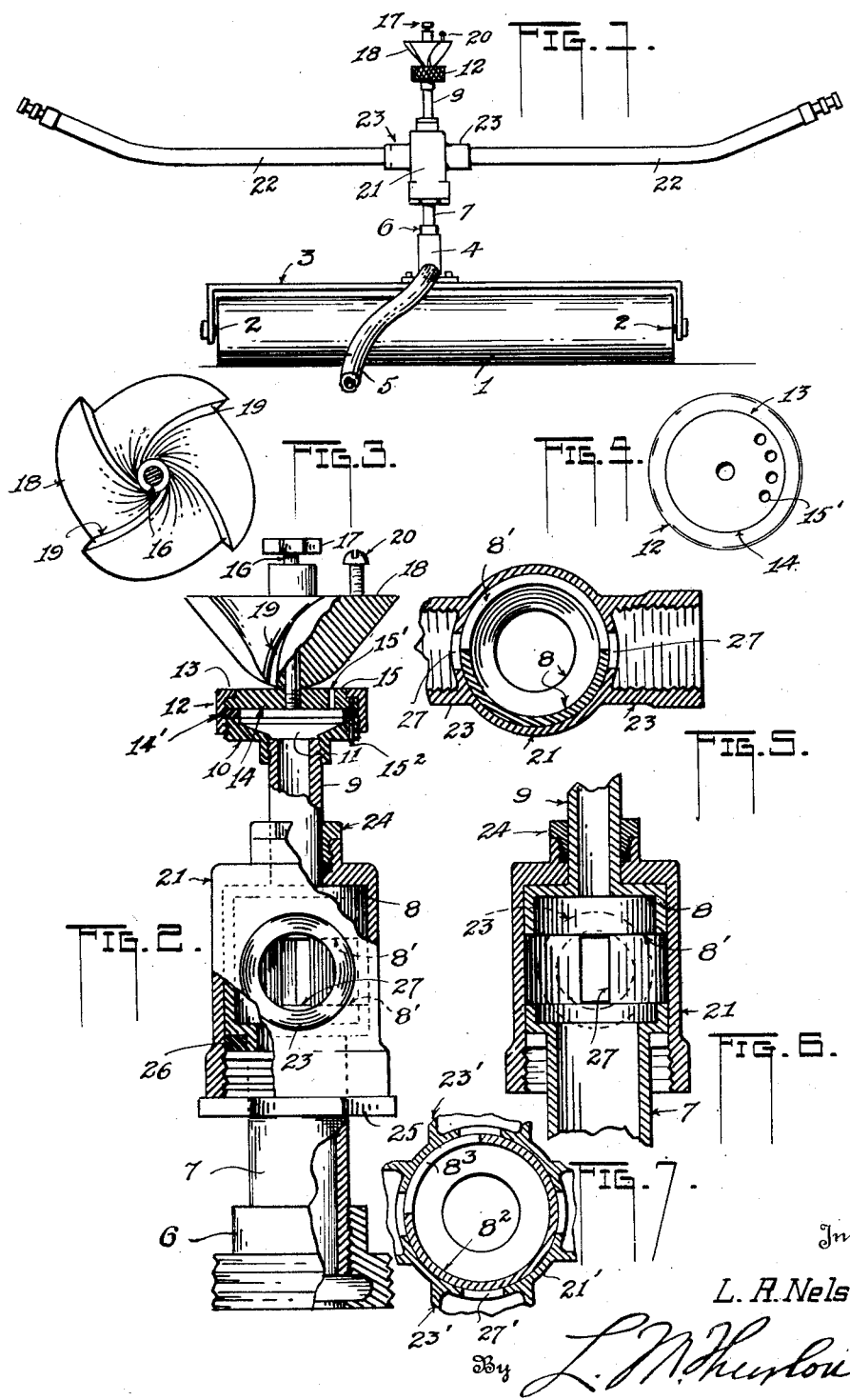
Inventor
L. R. Nelson,
By L. M. Thurlow
Attorney Patented Nov. 10, 1931

1,831,540

UNITED STATES PATENT OFFICE

LEWEN R. NELSON, OF PEORIA, ILLINOIS

LAWN SPRINKLER

Application filed March 20, 1930. Serial No. 437,585.

This invention pertains to sprinklers of a type adapted for springling portions only of a circular area, being of the rotary form and especially of services on lawns and golf courses where walks, driveways, or building foundations, for example, are to be protected during sprinkling operations.

One of the objects of the invention, therefore, is to provide a rotary type of sprinkler arranged and adapted for sprinkling parts only of a circular area.

Another object lies in providing a rotary type of sprinkler that will cast water over a wide territory and yet so arranged and adapted that the whole sprinkled area will be uniformly covered.

Another object is to provide a sprinkler including one or more sprinkler arms adapted to be rotated relatively slow whereby water can be thrown to the widest possible limit and to combine with the sprinkler structure a supplementary distributor-head or sprayhead rotatable at a higher rate of speed and so constructed or constituted that during rotation it will impart vibrations to the whole structure thus insuring that friction between the arms and the support therefor cannot act to stop rotation of such arms, such vibrations keeping the latter free at all times.

Still another object lies in providing a rotary sprinkler including sprinkler arms for throwing water over an extensive area and to combine therewith a rotary spray-head to assist in thoroughly and uniformly sprinkling such area and which includes an adjustable part for directing water streams toward and upon said spray-head at a given position.

The appended drawings is provided to assist in the understanding of the invention.

Figure 1 is an elevation of my invention shown mounted on a rolling support convenient for transportation and for locating the sprinkler in a desired position.

Figure 2 is an elevation of the invention shown about full size, parts being shown in vertical section.

Figure 3 is a plan of a distributor head or spray-head shown in Figure 2, but as seen from its under side.

Figure 4 is a plan of a perforated disc and retainer member shown in Figure 2.

Figure 5 is a longitudinal section of a rotatable sleeve and valve arrangement.

Figure 6 is a vertical section of the same, the parts having a different position relatively, and Figure 7 is similar to Figure 5 wherein certain modifications are shown.

In Figure 1 is illustrated a convenient rolling transport for the invention, and consists of a roller 1 having at each end a gudgeon 2, while 3 is a yoke upon which the sprinkler is supported, the ends of the yoke receiving the gudgeons.

A tubular standard 4 of any preferred form is secured to the yoke 3 and a hose 5 is connected into it in any approved manner. Screwed into the standard 4 is a nipple 6, for example, uprising from which is a tubular stem 7 which may have secured to or form part thereof an enlarged cavitied cylinder 8 best shown in Figures 5 and 6, extending from the top of which, and communicating with its cavity, is a tubular extension 9. Affixed to the top of the latter is a fitting 10 having a cavity 11, the outer surface of the said fitting being threaded to receive a shell 12 having an inwardly extending flange 13. A disc 14 fits within the shell beneath the said flange flush with its upper surface in the present instance. Erected upon the disc is a stem 16 which may be threaded into such disc and it may have a suitable head 17 for convenience in installing it. Said disc 14 encloses a packing-ring 14' between it and the margin of the fitting 10, said ring serving to prevent leakage of water, the said disc having one or more orifices 15' in one zone thereof near its margin.

Rotatable on the stem 16 is a spray-head or distributor-head 18 whose under surface is shown in Figure 3, being outwardly flared from bottom to top and fluted at a plurality of positions 19 to receive water streams from the named orifices 15' of the disc 14 for the rotation of said head. A slight weight at one side of the center of rotation of the head may be provided in the use of a screw 20, for example, whereby to obtain a slight unbalance of said head in rotation. However, in the absence of the screw or its equivalent vibrations more or less strong result from the meeting of water streams from the orifices 15' with the head, since striking the same at one side only of its center of rotation.

Enclosing the mentioned cylinder 8 and rotatable with respect thereto is a shell or sleeve 21 connected into two diametrically opposite extensions 23 of which is a sprinkler-arm 22. The arms thus provided are laterally bent at their outer or free ends in opposite directions and each is provided with an aperture, not shown, rotation of the shell or sleeve naturally resulting from the discharge of water-streams from said arms. The said shell is closed at its top except for the opening through which the tubular extension 9 projects, a packing nut 24 serving to prevent water escaping around said extension 9 while permitting free rotation of the shell. The lower portion of the last named member is internally threaded and receives a packing nut 25 which bears upon a packing-ring 26 lying against the lower extremity of the cylinder 8 and surrounding the stem 7. The latter and the cylinder 8 are fixed with respect to the yoke 3 described and, as will be understood, the shell 21 with its arms 22 rotate thereabout and thereby the outlets of said shell that lead to said arms are alternately opened and closed during rotation. That this result may be obtained substantially one-half of the cylindrical portion 8 is open as shown at 8' in Figure 3, as one form, and thus in the rotation of the said shell the ports 27 provided in diametrically opposite zones thereof are alternately exposed or covered. These said ports are elongated in the direction paralleling the axis of rotation and the edges thereof are preferably straight and parallel to said axis of rotation, see Figures 2 and 6.

It has been stated that the purpose of the invention is to sprinkle parts of a circular area. Water forced into the stem 7 will pass into the arms 22, rotating the shell 21. During rotation one of the ports 27 will communicate with the cavity of the cylinder 8 and water will be discharged from the arm 22 corresponding thereto during one-half only of the rotation of the latter. During this period the opposite port is closed so that the arm for that port discharges no water. In the succeeding one-half rotation the relation is reversed and the result of this action is to cause sprinkling of a semi-circular area while a like contiguous area is untouched by water and in this instance a substantially straight line separates the two areas, the timing of the opening and closing of the ports being such that the straight line is maintained. However, an area greater than one-half may be sprinkled by merely extending the opening 8' beyond the one-half shown in Figure 5, such extent depending upon the greater area it is the desire to treat. Again, areas less than one-half may be covered by an increase in the number of arms 22 and contracting the opening in the cylinder. For example, in the modification in Figure 7 the cylinder is denoted at $8^2$, it being observed that the opening now denoted by $8^3$ extends through but one-fourth of said cylinder and that there are now four of the extensions 23' of the sleeve 21' to carry sprinkler-arms 22 not shown in this figure. Clearly with this form one-quarter of a circular area may be treated, it being understood that segments of other forms can be covered by varying the relation of the opening of the cylinder to the openings or ports.

The arms 22 serve to throw water streams widely though there may be an indifferent sprinkling of the territory lying between the farthest throw and the sprinkler structure, perhaps, but in order that the intervening space may be sprinkled according to desire the rotary distributor-head or spray-head is provided. In making use of this head the disc 14 is adjusted so that the perforations 15' thereof lie toward the area to be sprinkled, the proper adjustment being made by turning the stem 16 after loosening the shell 12, resetting the latter after adjustment has been made. Or, as shown in Figure 2, a pin $15^2$ may extend through the disc 14 and the fitting 10, securing the two parts relatively. This may be used when the proper position of the orifices 15' is known to be correct and may be done in the factory. The issuance of the water streams from the perforations 15' results in the rotation of the head by striking the fluted portions at 19, the exact area to be sprinkled depending upon the adjustment of the disc 14 and the extent of spread of the perforations in their arcuate arrangement, the head deflecting the water from that side only, of course, on which the streams impinge.

The rate of rotation of the arms 22 is determined by the angle to which the bent extremities are set but in any event the rate of rotation of the spray-head 18 is preferably much higher. The vibrations of said spray-head 18 at the high rate of rotation will set up vibrations throughout the whole structure so that even though the arms 22 rotate ever so slowly there will be no likelihood of said arms stalling due to friction that may exist between the shell 21 and cylinder 8, the constant jarring preventing such an occurrence.

The spray-head 18 serves two purposes in that its vibrations insure positive rotation of the arm structure, and in that it serves to effect the thorough covering of the ground with water inward from the widest throw of water from the arms.

It is clear that other types of spray-heads may be used for covering part of a circular area that will communicate vibrations to the structure since it is not my wish to be confined to the form shown so long as the purposes thereof are realized.

I claim:

1. A lawn sprinkler including a tubular stem for carrying water under pressure and having a discharge opening, a structure rotatable on the stem including sprinkler-arms separately and successively communicating with such discharge opening during rotation, and a spray-head mounted on the stem arranged and adapted to communicate vibrations to the structure, there being a discharge opening leading from the stem directed toward said spray-head at one side thereof.

2. A lawn sprinkler including a tubular stem for carrying water under pressure and having a discharge opening, a structure rotatable on the stem including a pair of sprinkler-arms, the arms separately and alternately communicating with the discharge opening during rotation, and an unbalanced spray-head rotatably mounted on the stem, there being a discharge opening leading from said stem directed toward said head at one side of the axis of rotation thereof for directing water-streams upon said head.

3. A lawn sprinkler including a tubular stem for carrying water under pressure and having a discharge opening, a structure rotatable on the stem including a pair of sprinkler arms arranged to separately and successively communicate with the discharge opening during rotation whereby a portion only of a circular area will be sprinkled, and a vibratory spray-head rotatably mounted on the stem, there being a discharge opening leading from the stem directed toward the area being sprinkled for discharging a water stream against one side of said spray-head.

4. A lawn sprinkler of the rotary type including an erected tubular stem having a discharge opening, a shell mounted upon and adapted to rotate about the stem including sprinkler-arms arranged to communicate with the discharge opening of the stem in a part of each full rotation and adapted to sprinkle a predetermined portion only of a circular area, and an unbalanced driven rotary spray-head mounted on the stem adapted to vibrate during rotation and to communicate vibrations to the shell, said spray head being rotatable wholly independent of the sprinkler arms.

5. The combination with a lawn sprinkler including an upstanding water conducting stem having a discharge opening in its side, and a sleeve rotatable on said stem at said opening including oppositely disposed arms adapted to separately and alternately receive water from the stem during part of the rotation of said sleeve, of a spray-head rotatably mounted on the stem unbalanced in rotation and wholly independent of the action of the sleeve and its arms, and a member acting as a closure for the stem adjustable with respect thereto, and having a discharge aperture directed toward said head at one side thereof, said spray-head acting to vibrate the sleeve and its arms during rotation.

6. A lawn sprinkler including in its construction a rotating head arranged and adapted for sprinkling a portion only of a circular area, and a spray-head also arranged and adapted to sprinkle a portion only of a circular area, the same being constructed and arranged to transmit vibrations to the first named head.

7. A lawn sprinkler including in its construction a mounted rotatable water receiving head arranged and adapted for discharging water over a portion only of a circular area, and a spray-head arranged to receive against it a water stream and adapted to distribute water toward the area sprinkled by the first named head and being constructed and arranged to transmit vibrations to the said first named head through its mounting.

8. A lawn sprinkler including in its construction a tubular stem, a rotatable head mounted thereon arranged and adapted for discharging water over a portion of a circular area, and a spray-head also mounted on said stem arranged to receive against it a water stream and adapted to distribute water toward the area sprinkled by the first named head, and made capable of transmitting vibrations through the stem to said first named head.

In testimony whereof I affix my signature.

L. R. NELSON.